United States Patent
Zwanzger

(10) Patent No.: US 11,341,216 B2
(45) Date of Patent: May 24, 2022

(54) METHOD FOR THE COMPUTER-AIDED OBFUSCATION OF PROGRAM CODE

(71) Applicant: Siemens Aktiengesellschaft, Munich (DE)

(72) Inventor: Johannes Zwanzger, Neubiberg (DE)

(73) Assignee: SIEMENS AKTIENGESELLSCHAFT

(*) Notice: Subject to any disclaimer, the term of this patent is extended or adjusted under 35 U.S.C. 154(b) by 324 days.

(21) Appl. No.: 16/492,439

(22) PCT Filed: Dec. 13, 2017

(86) PCT No.: PCT/EP2017/082508
§ 371 (c)(1),
(2) Date: Sep. 9, 2019

(87) PCT Pub. No.: WO2018/162107
PCT Pub. Date: Sep. 13, 2018

(65) Prior Publication Data
US 2020/0042677 A1 Feb. 6, 2020

(30) Foreign Application Priority Data
Mar. 10, 2017 (DE) ...................... 10 2017 204 020.3

(51) Int. Cl.
*G06F 21/14* (2013.01)
*G06F 8/61* (2018.01)
(Continued)

(52) U.S. Cl.
CPC ................ *G06F 21/14* (2013.01); *G06F 8/61* (2013.01); *G06F 9/30029* (2013.01); *G06F 21/54* (2013.01); *G06F 2221/0748* (2013.01)

(58) Field of Classification Search
CPC . G06F 21/14; G06F 21/54; G06F 8/61; G06F 9/30029; G06F 2221/0748
See application file for complete search history.

(56) References Cited

U.S. PATENT DOCUMENTS

| 5,892,899 A | 4/1999 | Aucsmith et al. |
| 5,915,025 A | 6/1999 | Taguchi et al. |

(Continued)

FOREIGN PATENT DOCUMENTS

| EP | 0900488 A1 | 3/1999 |
| EP | 2937803 A1 | 10/2015 |

(Continued)

OTHER PUBLICATIONS

Non-English Korean Office Action for Application No. 1020197029606, dated Nov. 11, 2020.

(Continued)

*Primary Examiner* — Hee K Song
(74) *Attorney, Agent, or Firm* — Schmeiser, Olsen & Watts LLP

(57) ABSTRACT

Provided is a method for computer-aided obfuscation of program code, wherein a plurality of calculation steps is implemented in the program code, wherein predetermined calculation steps of the plurality of calculation steps are retrieved in a predetermined order with the execution of the program code, and at least some of the predetermined calculation steps are predefined calculation steps in which a respective first table that is stored in the program code and includes of a plurality of digital first tabular values is accessed in order to read a first tabular value required for the respective predefined calculation step from the first table. As part of the obfuscation of the program code, a dynamic mask formed by a plurality of digital mask values is used, wherein, for any predefined calculation step, another mask value is used to replace the first tabular value from the first table with a second tabular value.

10 Claims, 1 Drawing Sheet

(51) Int. Cl.
  *G06F 9/30* (2018.01)
  *G06F 21/54* (2013.01)

(56) References Cited

U.S. PATENT DOCUMENTS

| | | | | |
|---|---|---|---|---|
| 7,133,525 | B1* | 11/2006 | DeGregorio | H04N 1/4406 380/244 |
| 10,599,820 | B2* | 3/2020 | Hoogerbrugge | G06F 21/14 |
| 2003/0179883 | A1 | 9/2003 | Uchida | |
| 2003/0188187 | A1 | 10/2003 | Uchida | |
| 2011/0246787 | A1* | 10/2011 | Farrugia | G06F 21/14 713/189 |
| 2013/0232323 | A1* | 9/2013 | Lerouge | G06F 21/14 712/233 |
| 2014/0101458 | A1 | 4/2014 | Farrugia et al. | |
| 2014/0165208 | A1* | 6/2014 | Chevallier-Mames | G06F 21/14 726/26 |
| 2014/0380311 | A1* | 12/2014 | Deng | G06F 21/6245 718/1 |
| 2016/0180065 | A1 | 6/2016 | Hyun et al. | |
| 2016/0364474 | A1* | 12/2016 | Bay | G06F 16/148 |
| 2017/0257219 | A1* | 9/2017 | Yi | H04L 9/3247 |

FOREIGN PATENT DOCUMENTS

| | | |
|---|---|---|
| JP | H09258977 A | 10/1997 |
| JP | 2003280754 A | 10/2003 |
| JP | 2003280755 A | 10/2003 |
| KR | 101328012 B1 | 11/2013 |
| KR | 101619458 B1 | 5/2016 |

OTHER PUBLICATIONS

Japanese Office Action for Application No. 2019-548941, dated May 11, 2021.
Japanese Notice of Allowance for Application No. 2019-548941, dated Jun. 22, 2021.
PCT International Search Report and Written Opinion of International Searching Authority dated Mar. 29, 2018 corresponding to PCT International Application No. PCT/EP2017/082508 filed Dec. 13, 2017.
Non-English DE Search Report for Application No. 10 2017 204 020.3, dated May 2, 2019.

* cited by examiner

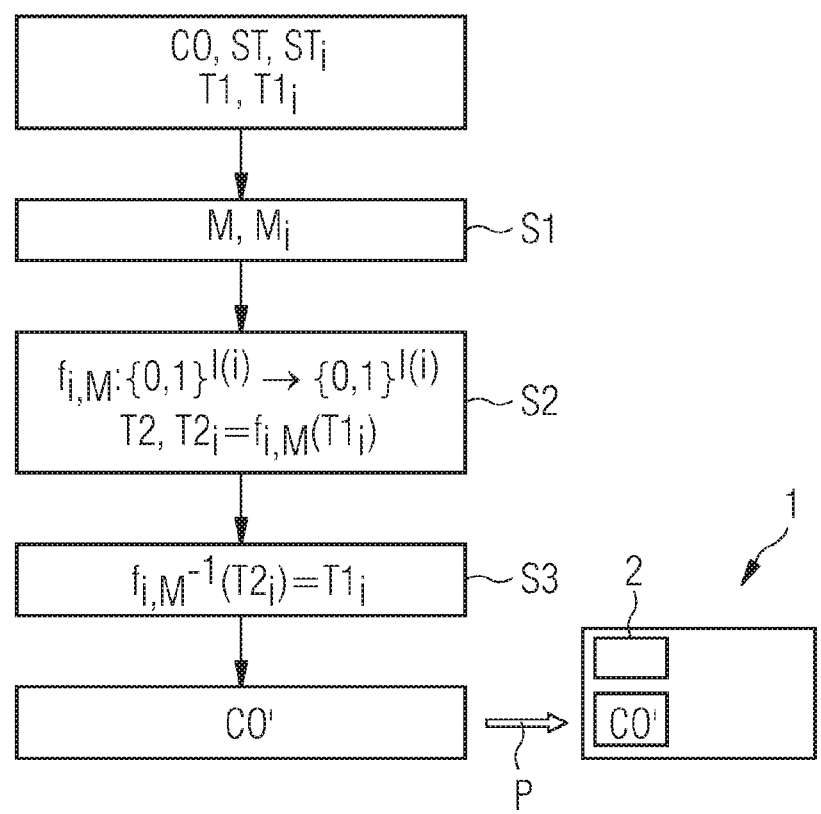

METHOD FOR THE COMPUTER-AIDED OBFUSCATION OF PROGRAM CODE

CROSS-REFERENCE TO RELATED APPLICATIONS

This application claims priority to PCT Application No. PCT/EP2017/082508, having a filing date of Dec. 13, 2017, which is based off of DE Application No. 10 2017 204 020.3, having a filing date of Mar. 10, 2017, the entire contents both of which are hereby incorporated by reference.

FIELD OF TECHNOLOGY

The following relates to a method for computer-aided obfuscation of program code and to a method for executing an obfuscated program code of this kind. Furthermore, embodiments of the invention comprises a technical system, a computer program product and a computer program.

BACKGROUND

Often, there is the need to protect information from a program code against unauthorized access by third parties. A popular approach in this case involves encrypting the information using a suitable encryption function or packaging the program code by a code packer. A disadvantage in this case is that the information is decrypted again or the code is unpacked again at the runtime of the program code, so that the information worthy of protection is available completely in plain text in the program memory during program execution and there is therefore the risk of an attacker reading this information from the memory by using suitable techniques.

SUMMARY

An aspect relates to provide a computer-protected method by which information worthy of protection in a program code is very well protected against unauthorized access by third parties at the runtime of the program code.

The method according to embodiments of the invention is used for computer-aided obfuscation (i.e. disguise) of program code. A multiplicity of computing steps are implemented in the program code to be disguised or obfuscated, wherein predetermined computing steps of the multiplicity of computing steps are called in a predetermined order when the program code is executed. The term computing step and also update step, mentioned later on, must be understood in a broad fashion in this case. A computing step does not necessarily have to contain only a single computing operation, but rather may be made up of a multiplicity of computing operations, possibly with conditions, loops, nests and the like. One computing step or update step can therefore encapsulate a sequence of operations.

The predetermined computing steps of the program code to be disguised contain prescribed computing steps. The predetermined computing steps can comprise for example only the prescribed computing steps, but there can also be provision for further computing steps if need be besides the prescribed computing steps. The prescribed computing steps are distinguished in that, in each of these steps, a first table saved in the program code and comprising a multiplicity of digital first table values is accessed in order to read from the first table a first table value needed for the respective prescribed computing step. Although all predetermined computing steps that are not prescribed computing steps (if present) continue to have a predetermined order stipulated for calling them, these computing steps do not access the first table.

The term table must be understood in broad fashion. A table is a set of digital values that can be deliberately accessed by the program code by appropriate commands. Further, the term table value must also be understood in broad fashion. In particular, a table value can be made up of multiple subvalues that are processed at different points in the accordingly called computing step.

The program code obfuscation according to embodiments of the invention involves a dynamic mask comprising a multiplicity of digital mask values being generated, wherein the mask values of at least part of the mask and all mask values of the mask differ from one another and a respective mask value is valid for a respective prescribed computing step.

The method according to embodiments of the invention involves each first table value of the first table being converted into a digital second table value by means of the mask value that is valid in the respective prescribed computing step when the respective first table value is read in, as a result of which a second table comprising second table values is obtained that is saved in the program code instead of the first table. In other words, no longer the first table values but rather the applicable second table values are accessed when the obfuscated program code is executed. The mask value that is valid in the respective prescribed computing step when the respective first table value is read in is also referred to as the currently valid mask value below.

So that the obfuscated program code delivers the same results as the nonobfuscated program code, the obfuscation further involves an additional computing step being implemented in the program code for each prescribed computing step, which computing step, when the applicable prescribed computing step is executed, converts a read second table value back into that first table value that is needed for the respective prescribed computing step.

The method according to embodiments of the invention has the advantage that a dynamic mask is used to very well disguise information worthy of protection that is saved in table form. The operations of demasking or unveiling are distributed over a multiplicity of computing steps in the whole program code in this case. Therefore, reconstruction of the disguised information during the runtime of the obfuscated program code is severely hampered.

In a particularly exemplary embodiment, an initial mask value and update steps are stipulated to generate the dynamic mask, wherein the mask value that is valid for the next prescribed computing step is calculated by applying one or more successive update steps to a currently valid mask value. The initial mask value and the update steps are also implemented in the program code, so that the currently valid mask value is present in the respective prescribed computing step, wherein the additional computing step in the respective prescribed computing step is dependent on the currently valid mask value. As a result of the implementation of the update steps in the program code, an attacker seeking to reconstruct a first table value in a prescribed computing step requires knowledge of the initial mask value and the preceding update steps. Since this knowledge is distributed in the program code, particularly good protection is achieved for the information in the program code.

In order to hamper conversion back to the original first table values, a variant of the embodiment just described involves the update steps for at least some of the mask values and in particular for all mask values to which they are applied being stipulated differently. In a further variant, there is provision for an update step in each of the prescribed computing steps wherein an update step is further also provided in each of at least some of the predetermined computing steps (in particular in all predetermined computing steps) that are not prescribed computing steps (if present).

In a further variant, the initial mask value and the update steps are stipulated by means of a random number generator. In this way, very arbitrary stipulation of these values and steps is achieved and hence the disguise of the program code is improved further.

In a further embodiment, the first table values and the second table values and also the mask values too each represent a bit sequence. The conversion of a respective first table value into a second table value is effected in this case by applying logic operations between the bit sequence of the first table value and the bit sequence of the currently valid mask value. The application of the logic operations delivers the second table value in this case.

The above logic operations are applied bit by bit to mutually corresponding bits of the bit sequences of the respective first table value and of the currently valid mask value, wherein the logic operations comprise one or more OR and/or XOR and/or NOR and/or XNOR and/or AND and/or NAND operations. In the event of the bit sequence of the currently valid mask value being longer than the bit sequence of the first table value, not all bits of the currently valid mask value are therefore used to modify the first table value.

In the event of the bit sequence of the currently valid mask value being shorter than the bit sequence of the respective first table value, a variant of the method according to embodiments of the invention involves the original bit sequence of the currently valid mask value being lengthened by repeatedly using the bits of the original bit sequence, so that a corresponding bit of the bit sequence of the currently valid mask value exists for each bit of the bit sequence of the respective first table value. The lengthening of the bit sequence is effected such that the original bit sequence is repeated one or more times. In this way, good disguise of the applicable (first) table value is achieved even if the bit length of the mask value is shorter than that of the applicable table value.

Besides the method for obfuscating program code, embodiments of the invention also relates to a method for executing the obfuscated program code. In this case, calling a respective prescribed computing step of the (obfuscated) program code results in the second table value being read from the second table and the additional computing step being carried out for the respective prescribed computing step, which additional computing step converts the read second table value back into that first table value that is needed for the respective prescribed computing step.

In the event of the obfuscated program code having been generated by means of an embodiment that uses update steps to determine the currently valid mask value, the execution of the obfuscated program code also involves the update steps implemented in the obfuscated program code being carried out.

Embodiments of the invention relates furthermore to a technical system that comprises a computer means or computer configured to execute the obfuscated program code in accordance with the method just described. The term technical system must be understood in broad fashion in this case, and this can also be a single technical appliance. The obfuscated program code may be saved in different technical systems in this case. The technical system can be e.g. an automation installation or a component of an automation installation or an electrical power generation and/or power distribution system or a component of a power generation and/or power distribution system or a medical appliance.

Furthermore, embodiments of the invention relates to a computer program product (non-transitory computer readable storage medium having instructions, which when executed by a processor, perform actions) having program code sections, stored on a machine-readable carrier, for performing the method according to embodiments of the invention for computer-aided obfuscation of program code or for performing the method according to the invention for executing the obfuscated program code or for performing variants of these methods when the program code sections are executed on a computer.

Furthermore, embodiments of the invention relates to a computer program, having program code sections for performing the method according to embodiments of the invention for computer-aided obfuscation of program code or for performing the method according to embodiments of the invention for executing the obfuscated program code or variants of these methods when the program code sections are executed on a computer.

In the event of the above computer program product or computer program being used to carry out a method for obfuscating program code, the obfuscation is caused by the applicable program code sections. The program code sections are therefore not the program code that is to be obfuscated.

In the event of the computer program product or the computer program being used to execute the obfuscated program code, the program code sections correspond to the obfuscated program code.

BRIEF DESCRIPTION

Some of the embodiments will be described in detail, with reference to the following FIGURES, wherein like designations denote like members, wherein:

The FIGURE shows a flowchart for an embodiment of the method according to embodiments of the invention for obfuscating program code.

DETAILED DESCRIPTION

According to FIG. 1, a starting point for the method is a program code CO that needs to be disguised within the realms of embodiments of the invention. This program code is provided with a multiplicity of computing steps, which are denoted by ST in FIG. 1. Some of these computing steps STi (i=1, ..., n) access a first table T1 in this case, with the respective computing step reading the applicable entry T1i from the table. The index i is used to stipulate the predetermined order in which the computing steps STi are executed in succession. The computing steps STi in this case correspond to prescribed computing steps. Between the computing steps STi, it is also possible for still further computing steps of the program code CO to be carried out, these further computing steps not accessing the table T1, however.

In accordance with the program code CO, a particular entry T1i of the first table T1 is therefore accessed only in the computing steps STi. The respective table entry in this case is a bit sequence that is processed in the applicable computing step. The bit sequences of the individual table entries have the length l(i) in this case. These lengths can be of different size for different table entries.

The program code CO generates a particular output from a known input by applying the computing steps ST at the runtime. Fundamentally, the computing steps ST can be performed in any order in this case, but the specific computing steps STi are always performed in the same order among one another and always precisely once regardless of the input. A respective computing step STi always accesses only a single table entry T1i, but the computing step is permitted to access this table entry as often as desired when it is carried out.

The nondisguised table T1 with the applicable table entries T1i contains information worthy of protection and it is the aim of the embodiment described below to obfuscate the program code CO such that an unauthorized third party cannot reconstruct the table entries from the program code, or can reconstruct them only with very great effort. In contrast to a one-time application of an encryption function to the whole table T1, the disguise is provided in a manner distributed over the whole program code, which severely hampers the conversion back to the original table values.

In accordance with step S1 of FIG. 1, a dynamic mask M having mask entries Mi (i=1, . . . , n) is first of all determined in order to obfuscate the program code CO. A corresponding mask value Mi therefore exists for each prescribed computing step STi. This mask value Mi is valid only for the computing step STi. The indexing of the mask values stipulates an order corresponding to the performance of the computing steps STi. The individual mask values Mi each represent a bit sequence having a specific length, this length remaining the same over the mask values Mi in the embodiment described here, which does not necessarily have to be the case, however.

The individual mask values Mi are determined by means of a succession of update steps that are applied to the most recently updated mask value in succession starting from an arbitrary initial mask value. The term update step must be understood in broad fashion in this case. In particular, an update step can contain not just a single operation but also multiple operations if need be. In the embodiment described here, the update steps have been stipulated arbitrarily and are therefore at least partially different among one another. Nevertheless, the individual update steps are firmly prescribed and the operations contained therein are carried out in a fixed order. In accordance with step S1, a mask M having arbitrary mask assignments or mask values Mi is therefore generated. A random number generator is used in this case to stipulate the initial value of the mask and to stipulate the update steps.

In a step S2, the table entry T1i read in the respective computing step STi is then altered by means of a function fi,M that is dependent on the mask value Mi that is valid in the applicable computing step STi. The function fi,M may have been stipulated in any fashion in this case; it is merely crucial that the function is dependent on the respective mask value Mi and bijectively maps a table entry T1i onto a new table entry T2i of a second table T2. As can be seen from FIG. 1, the function fi,M in this exemplary embodiment is mapping that maps the bit sequence of a table entry T1i onto another bit sequence having the same length, this other bit sequence corresponding to the new table entry T2i.

After modified table entries T2i have been generated for all computing steps STi, the original table entries T1i are replaced by these new table entries T2i, which means that the original table entries cannot readily be read from the program code CO by an attacker. Owing to the modification of the table entries, the program code CO also needs to be changed to the effect that the read table entry T2i is converted into the original table entry T1i in the applicable computing step STi. This is achieved in accordance with FIG. 1 in step S3. In this step, the initial mask value is saved at the start of the program code and the above update steps are also implemented in the program code, wherein calling a respective computing step STi results in an applicable update step being performed to determine the currently valid mask value in the embodiment described here. Furthermore, an additional step is implemented in each computing step, which additional step converts the read table entry T2i into the original table entry T1i by means of the inverse function fi,M−1, which is dependent on the currently valid mask value Mi.

As the result of steps S1 to S3, an obfuscated program code CO' is therefore obtained in which the original table T1 is disguised. A back-conversion step to obtain the original table values achieves the same computing result as with the nonobfuscated program code CO, however. The obfuscated program code CO' can subsequently be saved in any technical appliance and executed. This is indicated in FIG. 1 by the arrow P. In this case, the obfuscated program code CO' is stored on the technical appliance 1, which has a computer means 2 that is used to execute the obfuscated program code CO'.

The obfuscation described above for a program code can be used in various technical fields. In particular, program code in SCADA systems, PLCs (programmable logic controllers), motion control systems, automation software, computed tomography scanners, SmartGrids, etc., can be altered in this case. It is possible for any algorithms to be obfuscated in this case, e.g. programs on PCs (personal computers) or firmware on appliances. The programs can undertake any tasks, e.g. can be open-loop and/or closed-loop control algorithms or algorithms based on neural networks.

Generally, the effect achieved by means of the obfuscation according to embodiments of the invention is that data stored in table form and worthy of protection are disguised in a piece of software. The data worthy of protection can be e.g. cryptographic information or information that is important for license checks.

The embodiment described above for the method according to embodiments of the invention has a series of advantages. In particular, the masking of a table means that an attacker can no longer extract any kind of information from this table. In order to be able to usefully interpret the masked form of the table, additional knowledge of the initialization value of the mask and of the whole succession of update steps for the mask is necessary instead.

In contrast to one-time decryption or unpacking operations, the steps of demasking the table do not take place at an isolated point in the program code, but rather the demasking is distributed over the whole program code. An attacker therefore needs to analyze the whole program code in order to draw conclusions about the original values of the table. By contrast, in the case of one-time encryption of a table, an attacker can immediately access the plain text of the table entries given knowledge of the decryption.

The obfuscation according to embodiments of the invention further does not allow more than the table entry used in the current step to be readily inferred on the basis of the memory state, i.e. in particular the current mask value, at any time in the execution of the program code. As soon as the mask value is next updated, it is no longer possible to infer the earlier table entry.

The obfuscation method according to embodiments of the invention can further be combined very well with further techniques of reverse engineering, such as e.g. anti debug measures or the use of self-modifying codes. In this way, it becomes even more difficult for an attacker to reconstruct the whole sequence of demasking operations to extract the original table values.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-aided obfuscation of program code, wherein a multiplicity of computing steps are implemented in the program code, wherein predetermined computing steps of the multiplicity of computing steps are called in a predetermined order when the program code is executed, and at least some of the predetermined computing steps are prescribed computing steps, in each of which a first table saved in the program code and comprising a multiplicity of digital first table values is accessed in order to read from the first table a first table value needed for the respective prescribed computing step, wherein the following steps are carried out to alter the program code:

generating a dynamic mask comprising a multiplicity of digital mask values, wherein the mask values of at least part of the mask differ from one another and a respective mask value is valid for a respective prescribed computing step;

converting each first table value of the first table into a digital second table value by the mask value that is valid in the respective prescribed computing step when the respective first table value is read in, as a result of which a second table comprising second table values is obtained that is saved in the program code instead of the first table; and implementing an additional computing step in the program code for each prescribed computing step, which computing step converts a read second table value back into that first table value that is needed for the respective prescribed computing step, wherein an initial mask value and update steps are stipulated to generate the dynamic mask, wherein the mask value valid for a next prescribed computing step is calculated by applying one or more successive update steps to a currently valid mask value, wherein the update steps are also implemented in the program code, so that the currently valid mask value is present in the respective prescribed computing step, wherein the additional computing step in the respective prescribed computing step is dependent on the currently valid mask value, wherein the update steps for at least some of the mask values to which they are applied are stipulated differently, wherein an update step is implemented in each of the prescribed computing steps, and wherein an update step is further also implemented in each of at least some of the predetermined computing steps that are not prescribed computing steps.

2. The method as claimed in claim 1, wherein at least one of the initial mask value and the update steps are stipulated by a random number generator.

3. The method as claimed in claim 1, wherein the first table values and the second table values and also the mask values each represent a bit sequence.

4. The method as claimed in claim 3, wherein the conversion of a respective first table value into a second table value is performed by applying logic operations between the bit sequence of the respective first table value and the bit sequence of the currently valid mask value, wherein the application of the logic operations delivers the second table value.

5. The method as claimed in claim 4, wherein the logic operations are applied bit by bit to mutually corresponding bits of the bit sequences of the respective first table value and of the currently valid mask value, wherein the logic operations comprise one or more OR, XOR, NOR, XNOR, AND and NAND operations.

6. The method as claimed in claim 5, wherein in the event of the bit sequence of the currently valid mask value being shorter than the bit sequence of the respective first table value, the original bit sequence of the currently valid mask value is lengthened by repeated use of the bits of the original bit sequence, in particular by repeating the original bit sequence one or more times, so that a corresponding bit of the bit sequence of the currently valid mask value exists for each bit of the bit sequence of the respective first table value.

7. A method for executing a program code obfuscated by a method as claimed in claim 1, wherein calling a respective prescribed computing step of the program code results in the second table value being read from the second table and the additional computing step being carried out for the respective prescribed computing step, which additional computing step converts the read second table value back into that first table value that is needed for the respective prescribed computing step.

8. A technical system, wherein the technical system comprises a computer or computer means configured to execute a program code in accordance with the method as claimed in claim 7.

9. The technical system as claimed in claim 8, wherein the technical system is an automation installation or a component of at least one of an automation installation or an electrical power generation, power distribution system or a component of an electrical power generation and power distribution system or a medical appliance.

10. A computer program product, comprising a computer readable hardware storage device having computer readable program code stored therein, said program code executable by a processor of a computer system to implement the method as claimed in claim 1 when the program code sections are executed on a computer.

* * * * *